United States Patent
Rombola

(10) Patent No.: US 10,858,286 B2
(45) Date of Patent: Dec. 8, 2020

(54) POLYMER MIXTURES

(71) Applicant: SIKA TECHNOLOGY AG, Baar (CH)

(72) Inventor: Ottavio Rombola, Lyndhurst, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 38 days.

(21) Appl. No.: 16/077,819

(22) PCT Filed: Mar. 2, 2017

(86) PCT No.: PCT/EP2017/054860
§ 371 (c)(1),
(2) Date: Aug. 14, 2018

(87) PCT Pub. No.: WO2017/157677
PCT Pub. Date: Sep. 21, 2017

(65) Prior Publication Data
US 2019/0152852 A1 May 23, 2019

(30) Foreign Application Priority Data
Mar. 15, 2016 (EP) .................................. 16160520

(51) Int. Cl.
| | | |
|---|---|---|
| *C04B 24/26* | (2006.01) | |
| *C04B 28/02* | (2006.01) | |
| *C08L 87/00* | (2006.01) | |
| *C08L 33/02* | (2006.01) | |
| *C08G 81/02* | (2006.01) | |
| *C04B 103/00* | (2006.01) | |
| *C04B 103/40* | (2006.01) | |

(52) U.S. Cl.
CPC ...... *C04B 24/2647* (2013.01); *C04B 24/2658* (2013.01); *C04B 28/02* (2013.01); *C08G 81/025* (2013.01); *C08L 33/02* (2013.01); *C08L 87/005* (2013.01); *C04B 2103/006* (2013.01); *C04B 2103/408* (2013.01); *C08L 2205/025* (2013.01); *Y02W 30/92* (2015.05); *Y02W 30/94* (2015.05)

(58) Field of Classification Search
CPC . C04B 24/2647; C04B 24/2658; C04B 28/02; C08G 81/025; C08L 33/02; C08L 87/005
See application file for complete search history.

(56) References Cited

U.S. PATENT DOCUMENTS

| | | | |
|---|---|---|---|
| 2013/0030087 A1 | 1/2013 | Sulser et al. | |
| 2013/0217808 A1* | 8/2013 | Sulser | ............ C04B 24/26 524/5 |

FOREIGN PATENT DOCUMENTS

| | | |
|---|---|---|
| EP | 1 138 697 A1 | 10/2001 |
| EP | 1 138 697 B1 | 11/2003 |
| WO | 2010/064098 A1 | 6/2010 |

OTHER PUBLICATIONS

Jun. 20, 2017 International Search Report issued in International Patent Application No. PCT/EP2017/054860.
Jun. 20, 2017 Written Opinion of the International Searching Authority issued in International Patent Application No. PCT/EP2017/054860.

* cited by examiner

*Primary Examiner* — John E Uselding
(74) *Attorney, Agent, or Firm* — Oliff PLC

(57) ABSTRACT

A process for preparing a polymer mixture containing at least two different comb polymers, wherein the comb polymers each have a polymer backbone having side chains attached via ester and/or amide groups, which process includes the steps of: a) providing and/or preparing a reaction mixture containing at least a first base polymer bearing acid groups and a second base polymer bearing acid groups, wherein the two base polymers differ chemically; b) conjointly esterifying and/or amidating the two base polymers with at least one unilaterally hydroxyl-terminated side chain compound and/or with at least one unilaterally amino-terminated side chain compound to obtain at least two different comb polymers.

15 Claims, No Drawings

POLYMER MIXTURES

TECHNICAL FIELD

The invention relates to a process for preparing a polymer mixture containing at least two different comb polymers, wherein the comb polymers each have a polymer backbone having side chains attached via ester and/or amide groups. The invention further relates to a polymer mixture obtainable with the process of the invention, to a mineral binder composition and to a shaped article obtainable therefrom. Further aspects relate to uses of polymer mixtures in mineral binder compositions.

PRIOR ART

Dispersants acting as superplasticizers or water-reducing agents are an important admixture to binder compositions of the type employed in the building construction industry, e.g. concrete, mortar, cements, plasters and lime. The employment of such dispersants is well known. Such superplasticizers or dispersants are generally organic polymers which are admixed to the mixing water or, in solid form, to the binder compositions. The consistency of the composition prior to setting is advantageously modified as a result. More particularly, yield point and viscosity decrease, which improves workability. Reducing the water content serves to improve the strength of the cured binder composition.

Dispersants employed include inter alia comb polymers formed from $\alpha,\beta$-unsaturated mono- and polycarboxylic acids with polyalkylene side chains—known as superplasticizers. Compounds of this type are for example described in EP 1 138 697 B1 (Sika AG).

While binder compositions containing comb polymers of this type do often exhibit the desired workability, the latter will in some instances quickly decrease markedly, which narrows the time window for using the binder composition. There are many applications, however, where longer periods of usability are desirable or even necessary.

While numerous methods have been recommended and specific admixtures and polymers developed for addition to the binder compositions in an attempt to extend the workability and/or slump life, many of these measures are complicated in manufacture, inconvenient in use, too costly, or unable to convince in respect of superplasticizing performance.

There accordingly continues to be a need for alternative dispersants which do not have the aforementioned disadvantages and are very simple and inexpensive to produce.

SUMMARY OF THE INVENTION

It is an object of the present invention to provide a dispersant enabling a very long workability life for binder compositions whilst providing good superplasticizing performance. The dispersant shall in particular be deployable in mineral binder compositions such as, for example, concrete or mortar compositions. It is a further object of the present invention to provide a very simple and inexpensive process for preparing dispersants of this type.

We have found that, surprisingly, these objects are achieved by polymer mixtures containing at least two different comb polymers and obtained by the process according to claim 1 of the present invention. At the core of the invention is accordingly the polymer-analogous reaction of at least two chemically different base polymers bearing acid groups with at least one unilaterally hydroxyl-terminated side chain compound and/or with at least one unilaterally amino-terminated side chain compound to obtain a polymer mixture containing at least two different comb polymers.

The polymer mixtures of the present invention, when employed in mineral binder compositions, achieve a water reduction comparable to conventional comb polymers and at the same time a considerably extended/improved workability or slump life. This is surprising because mixtures of comparable comb polymers prepared—contrary to the present invention—individually/separately and only mixed with each other subsequently perform significantly worse, in respect of slump life in particular, than the polymer mixtures obtained according to the present invention.

Further independent claims relate to further aspects of the invention. Dependent claims relate to particularly preferred embodiments of the invention.

WAYS TO CARRY OUT THE INVENTION

A first aspect of the present invention relates to a process for preparing a polymer mixture containing at least two different comb polymers, wherein the comb polymers each have a polymer backbone having side chains attached via ester and/or amide groups, which process comprises the steps of:
a) providing and/or preparing a reaction mixture containing at least a first base polymer bearing acid groups and a second base polymer bearing acid groups, wherein the two base polymers differ chemically;
b) conjointly esterifying and/or amidating the two base polymers with at least one unilaterally hydroxyl-terminated side chain compound and/or with at least one unilaterally amino-terminated side chain compound to obtain the at least two different comb polymers.

The term "comb polymer" herein designates a polymer comprising a base polymer (also known as "backbone", "polymer backbone" or "main chain") whereto a multiplicity of side chains are attached by covalent bonding, so overall the molecular structure resembles a comb. The comb polymers of the present invention have side chains attached to the base polymer by ester and/or amide groups. Optionally, however, besides these side chains, there may additionally be further side chains, attached to the base polymer via other groups.

The term "acid groups" refers particularly to functional groups that are in anionic or negatively charged form at pH >10, in particular at pH >12. They are proton donor groups in particular. It is particularly preferable for the acid groups to be carboxylic acid, sulphonic acid, phosphoric acid and/or phosphonic acid groups. Carboxylic acid groups are particularly preferable.

The acid groups may also be present as anions in deprotonated form or as salt with a counter-ion and/or cation.

In principle, different acid groups may be attached to the same base polymer at one and the same time. Typically, however, a base polymer bears a single variety of acid groups.

The process of the present invention is in principle based on the so-called "polymer-analogous preparation" of comb polymers in that a base polymer comprising functional groups, e.g. acid groups, is reacted with unilaterally reactive side chain compounds to form a polymer of comb structure. In contradistinction to existing methods of preparation, however, the invention deploys at least two chemically different base polymers at one and the same time. This causes the polymer-analogous reaction to produce at least two different comb polymers, differing with regard to the polymer backbone or the base polymer. By contrast, the side chains of the at least two different comb polymers may be at least partly or wholly identical.

The unilaterally hydroxyl-terminated side chain compound and/or the unilaterally amino-terminated side chain compound are endcapped at the opposite end in particular. More particularly, apart from the hydroxyl group or the amino group, the hydroxyl-terminated side chain compound and/or the unilaterally amino-terminated side chain compound have no further functional groups capable of reacting in the esterification and/or amidation reaction. In other words, the unilaterally hydroxyl-terminated side chain compound and/or the unilaterally amino-terminated side chain compound are unilaterally reactive compounds in particular. This puts a stop to crosslinking reactions taking place between the two base polymers.

The first base polymer and/or the second base polymer are/is more particularly selected from polycarboxylic acids, polyphosphoric acids, polyphosphonic acids and/or polysulfonic acids. The recited acids may be present in neutral form and/or as salts. In the case of salts, the acid groups of the acids are in a partly and/or wholly deprotonated state.

It is particularly preferable for the first and second base polymers to each be selected from polycarboxylic acids. The specific preference here is for polycarboxylic acids formed from unsaturated monocarboxylic acids, for example acrylic acid and/or methacrylic acid. Base polymers of this type are readily available commercially and allow a relatively simple form of reaction management in preparation. In addition, the process of the present invention thereby provides advantageous polymer mixtures having sustained dispersing effects in mineral binders. Specific applications, however, may suitably also employ other base polymers, for example polycarboxylic acids formed from unsaturated dicarboxylic acids, e.g. maleic acid or maleic anhydride.

In a particularly preferred embodiment, the first and second base polymers are each selected from polyacrylic acid, polymethacrylic acid and/or copolymers formed from acrylic acid and methacrylic acid.

In an especially advantageous embodiment, the first base polymer is in the form of polyacrylic acid while the second base polymer is in the form of polymethacrylic acid.

A number-averaged molecular weight ($M_n$) of the first base polymer and of the second base polymer is in particular in each case in the range of 500-20 000 g/mol, in particular 500-10 000 g/mol, more preferably 3000-5000 g/mol. This provides particularly good dispersing effects in mineral binders.

The weight-averaged molecular weight ($M_w$) and the number-averaged molecular weight ($M_n$) herein are determined by gel permeation chromatography (GPC) using polyethylene glycol (PEG) as standard. This technique is known per se to the person skilled in the art.

The base polymers described above are all commercially available from various suppliers. In addition, the recited base polymers are obtainable in a conventional manner from corresponding monomers, for example acrylic acid and/or methacrylic acid, in the presence of free-radical initiators and/or chain transfer agents, by chain growth addition polymerization.

A molar ratio of the first base polymer to the second base polymer in step a) is in particular in the range of 90:10-10:90, in particular 75:25-25:75, preferably 60:40-40:60. Molar ratios of 50:50 have been found to be particularly suitable here.

Dispersing performance in binder compositions is precisely alignable with selected requirements by varying the molar ratio of the base polymers.

The unilaterally hydroxyl-terminated side chain compound, if used, is particularly a monohydroxy compound or a compound having one free hydroxyl group. Similarly, if used, the unilaterally amino-terminated side chain compound is a monoamino compound or a compound having one free amino group. The amino group is preferably a primary amino group or a secondary amino group, in particular a primary amino group.

In particular, the unilaterally hydroxyl-terminated side chain compound is a compound of formula (I)

HO—R¹                                                                   (I)

The unilaterally amino-terminated side chain compound is advantageously a compound of formula (II)

$H_2N$—R²                                                                 (II)

In these formulae, $R^1$ and $R^2$ are each independently a $C_1$- to $C_{20}$-alkyl group, -cycloalkyl group, -alkylaryl group or a group of the formula -$[AO]_n$—$R^a$, where A=$C_2$- to $C_4$-alkylene, $R^a$ is H, a $C_1$- to $C_{20}$-alkyl group, -cycloalkyl group or -alkylaryl group, and n=2-300. In particular, $R^a$ is a $C_1$- to $C_{20}$-alkyl group, -cycloalkyl group or -alkylaryl group.

n is advantageously=5-150, preferably 10-100, more preferably 15-75 or 20-60. In one particular embodiment, n is = 5-25 or 7-15.

In one preferred embodiment, the unilaterally hydroxyl-terminated side chain compound comprises an α-alkoxy-ω-hydroxy-polyoxyalkylene and/or the unilaterally amino-terminated side chain compound comprises an α-alkoxy-ω-amino-polyoxyalkylene. Most preferably, the unilaterally amino-terminated side chain compound comprises an α-alkoxy-ω-amino-oxyethylene-oxypropylene copolymer.

A weight-averaged molecular weight ($M_w$) of the side chain compounds is in particular in each case 100-10 000 g/mol, in particular 200-7000 g/mol, specifically 350-5000 g/mol, especially 400-3000 g/mol or 500-2000 g/mol.

In a very particularly preferred embodiment, the unilaterally hydroxyl-terminated side chain compound comprises a compound of the formula HO-$[AO]_n$—$R^a$ and/or the unilaterally amino-terminated side chain compound comprises a compound of the formula $H_2N$-$[AO]_n$—$R^a$, where A, $R^a$ and n are each as defined above.

In one preferred embodiment of the invention, of the total number of all $[AO]_n$ units in the side chain compounds, ethylene oxide units comprise a proportion of at least 30 mol %, preferably 50-100 mol %, in particular 80-100 mol % or 90-100 mol %. In one particular embodiment, the alkylene oxide units present in the side chains are all exclusively in the form of ethylene oxide units.

In the unilaterally hydroxyl-terminated side chain compounds conforming to formula HO-$[AO]_n$—$R^a$, the substituent A is particularly a $C_2$-alkylene.

In the unilaterally amino-terminated side chain compound of the formula $H_2N$-$[AO]_n$—$R^a$, the substituent A is preferably a mixture of $C_2$- and $C_3$-alkylene.

The side chain compounds used in step b) are commercially available from various suppliers (e.g. Sigma-Aldrich Chemie GmbH, Switzerland; Huntsman, Switzerland).

The person skilled in the art knows that an esterification reaction is an equilibrium reaction dependent on the concentration of the reactants and the pH. Therefore, the amount of the starting materials used and the pH are established relative to each other such that an efficient reaction ensues.

The pH of the reaction mixture in the reaction of step b) is preferably in the slightly acidic range, in particular between 3 and 6 or between 3 and 5.5. Preferably, the pH in the reaction of step b) is above 3, in particular above 3.5.

Preferably, a base and/or an acid are/is added before and/or during steps a) and/or b), in particular as a catalyst or to establish the pH.

An advantageous base is selectable from metal carboxylates, metal hydroxides, metal carbonates, thiocyanates and phosphites. In one preferred embodiment of the invention, the metal of the base is an alkali metal or an alkaline earth metal, in particular sodium or potassium. In one preferred embodiment of the invention, the carboxylate is a carbonate, formate, acetate, propionate, citrate, adipate, maleate or tartrate. The carboxylate is preferably a sodium carboxylate or a potassium carboxylate, in particular an acetate or formate. The use of potassium salts is preferable.

The base may be used to at least partly neutralize and/or deprotonate the acid groups of the base polymers in the reaction mixture. The degree of neutralization and/or the proportion of deprotonated acid groups of the base polymers in the reaction mixture of step a) is preferably between 2% and 50%, preferably between 4% and 30%, more preferably between 5% and 20% or between 5% and 15%, based on all the acid groups present in the base polymers.

Suitable acids effective as catalysts in step b) preferably have a $pK_a$ value below 3, in particular below 1. Preferred acids are, for example, sulfuric acid and/or p-toluenesulfonic acid.

The reaction in step b) is also dependent on the water content of the reaction mixture. In general, a low water content promotes the reaction. When the water content of the reaction mixture is too high, for example because the starting materials are provided in the form of aqueous solutions or dispersions, some of the water should be removed before conducting the reaction. The water content is preferably reduced by the heating in steps a) and/or b), and the distilled water is removed.

The esterifying and/or amidating in step b) is carried out in particular at a temperature of at least 80° C., preferably at least 100° C., more preferably between 120-200° C., most preferably between 160-180° C. A preferred temperature is 175° C. for example. Temperatures above 100° C. are preferable in step b) in particular, since this makes for efficient removal of water.

The amount of the unilaterally hydroxyl-terminated side chain compound used and/or of the unilaterally amino-terminated side chain compound used is established such that the desired degree of esterification and/or amidation of the base polymer is obtained.

In one particularly preferred embodiment, step b) comprises practising at least an esterification reaction with a unilaterally hydroxyl-terminated side chain compound. This gives a polymer mixture comprising comb polymers having side chains attached via ester groups.

In particular, a proportion of the unilaterally hydroxyl-terminated side chain compound, based on the total number of all side chain compounds used in step b), is 50-100 mol %, in particular 75-100 mol %, preferably 95-100 mol % or 99-100 mol %. This provides comb polymers having a significant proportion of side chains attached via ester groups. This has turned out advantageous herein to obtain a high sustained superplasticizing effect in binder compositions.

The conversion of the side chain compounds and/or the progress of the esterification and/or amidation reaction in step b) may be policed in a conventional manner, for example by means of liquid chromatography, in particular high-performance liquid chromatography (HPLC; UPLC).

In particular, the esterifying and/or amidating step is continued until a ratio of free acid groups on the base polymers to the number of attached side chains in the comb polymers formed is in the range of 0.5-12, preferably 1-12, more preferably 1.5-5 or 2-4.

The esterification and/or amidation reaction may be carried out in the presence of a further compound capable of reacting with the acid groups of the base polymers. Examples of a further compound are additional amines or alcohols, for example a $C_6$-$C_{20}$-alkyl alcohol or a further mono- or diamine, preferably a monoamine. Two or more different further compounds may also be employed.

In a second aspect, the present invention provides a polymer mixture containing at least two different comb polymers as obtainable by an above-described process.

A third aspect relates to a binder composition containing a mineral binder as well as a polymer mixture as obtainable by an above-described process. The binder composition is, in particular, a mortar composition, a concrete composition or a cementitious composition.

The expression "mineral binder" is to be understood as meaning a binder which reacts with water in a hydration reaction to form solid hydrates or hydrate phases. This may be, for example, a hydraulic binder (e.g. cement or hydraulic lime), a latently hydraulic binder (e.g. slag), a pozzolanic binder (e.g. flyash) or a non-hydraulic binder (plaster or white lime). A "cementitious binder" herein is a binder or binder composition comprising at least 5 wt %, preferably at least 20 wt %, more preferably at least 35 wt % and yet more preferably at least 65 wt % of cement clinker. The cement clinker is preferably a Portland cement clinker. Cement clinker in the present context is to be understood as meaning in particular ground cement clinker.

In particular, the mineral binder or the binder composition contains a hydraulic binder, preferably cement. A cement having a cement clinker content of ≥35 wt % is particularly preferable. The cement is more particularly of the type CEM I, CEM II and/or CEM IIIA (as per the EN 197-1 standard). The proportion of total mineral binder that is attributable to hydraulic binder is preferably at least 5 wt %, more preferably at least 20 wt %, yet more preferably at least 35 wt % and yet still more preferably at least 65 wt %. In a further advantageous embodiment, the mineral binder comprises ≥95 wt % of hydraulic binder, in particular cement clinker.

However, it may also be advantageous for the binder or binder composition to contain or consist of other binders. These are, in particular, latently hydraulic binders and/or pozzolanic binders. Examples of suitable latently hydraulic and/or pozzolanic binders include slag, flyash and/or silica dust. The binder composition may similarly contain inerts such as, for example, limestone, quartz flours and/or pigments. In one advantageous embodiment, the mineral binder contains 5-95 wt %, preferably 5-65 wt % and more preferably 15-35 wt % of latently hydraulic and/or pozzolanic binders. Slag and/or flyash are advantageous latently hydraulic and/or pozzolanic binders.

In one particularly preferred embodiment, the mineral binder contains a hydraulic binder, in particular cement or cement clinker, and a latently hydraulic and/or pozzolanic binder, preferably slag and/or flyash. The proportion of the latently hydraulic and/or pozzolanic binder is more preferably 5-65 wt %, more preferably 15-35 wt %, while the hydraulic binder comprises at least 35 wt %, specifically at least 65 wt %.

The mineral binder is preferably a hydraulic binder, in particular cement, preferably Portland cement.

In a further preferred embodiment, the binder composition additionally contains solid aggregates, in particular gravel, sand and/or graded rock. Corresponding compositions are employable as mortar mixtures or concrete mixtures for example.

In particular, the binder composition additionally contains water, preferably in a weight ratio of water to mineral binder in the range of 0.25-0.8, in particular 0.3-0.6, preferably 0.35-0.5. Binder compositions of this type are directly usable as mortar mixtures or concrete mixtures.

As a proportion of the binder composition, the polymer mixture comprises in particular a fraction of 0.001-10 wt %, in particular 0.01-5 wt %, especially 0.1-1 wt %, based on the mineral binder plus the comb polymers in the polymer mixture.

The polymer mixture is preferably employed in the form of a liquid composition, in particular as an aqueous solution.

The polymer mixture of the invention, however, is also employable in the solid state, for example as flake, powder, chip, pellet, granule or sheet. Solid admixtures of this type are readily transportable and storable. The polymer mixture in the solid state may be a constituent part of a so-called dry mix, of a cement composition for example, which is storable for a prolonged period and is typically packed in bags or stored in silos and used in that form. Such a dry mix is usable even after prolonged storage and is free-flowing.

The polymer mixture of the present invention may be added to a binder composition at the same time as, shortly before and/or shortly after the water.

Addition in the form of an aqueous solution or dispersion, in particular as mixing water or as part of the mixing water, has been found to be particularly suitable here. The aqueous solution is more particularly prepared by subsequent mixing with water. However, the polymer mixture of the present invention may also be added to a binder composition before or during its grinding operation, for example from cement clinker to cement.

The polymer mixture of the present invention is preferably employed as a dispersant, in particular as a superplasticizing and/or water-reducing dispersant. Specifically, the polymer mixture is employed to improve the workability and/or flowability of binder compositions prepared therewith, and also to improve the stability of the cured products. In particular, the invention provides binder compositions having prolonged workability. That is, the binder composition remains workable, following addition of water and of the polymer mixture, for a longer period than comparable binder compositions without the polymer mixture.

In particular, the polymer mixture increases the flowability of a binder composition. Preferably, the admixture of the polymer mixture increases the flow value by at least 5%, in particular more than 10%, yet more preferably by more than 15% or more than 25%, all compared with an identical composition without polymer mixture. The flow value in question may be determined as described in the working examples.

The polymer mixture of the present invention is employable as a dispersant or as a constituent part of a dispersant in combination with further components.

Further constituents may be other superplasticizers, for example polycarboxylate ethers (PCEs), lignosulphonates, sulphonated naphthalene-formaldehyde condensates or sulphonated melamine-formaldehyde condensates; or accelerators, retarders, shrinkage reducers, defoamers, air void formers or foam formers. The proportion of the polymer mixture is typically in the range from 5 to 100 wt %, in particular in the range from 20 to 100 wt %, based on the total weight of the dispersant and of the comb polymers in the polymer mixture.

The invention also provides a shaped article obtainable by setting and curing a binder composition of the present invention after addition of water. For the purposes of the present invention, the term "shaped article" is to be understood as meaning any three-dimensional solid article that has acquired a shape, examples being mobile civil-engineering elements, buildings and parts of a building, floors and coatings.

Further aspects of the present invention relate to various uses for a polymer mixture as described above in connection with mineral binders. The polymer mixtures have been found to be particularly suitable for the following uses or purposes:

The use of a polymer mixture as flow agent and/or superplasticizer for mineral binder compositions or mineral binders, in particular for hydraulically setting binders, preferably cementitious binders, more preferably for Portland cement.

The use of a polymer mixture in a composition containing a mineral binder or in a mineral binder composition to extend the workability life. This particularly with hydraulically setting binders, preferably cementitious binders, in particular Portland cement.

The use of a polymer mixture in a composition containing a mineral binder or in a mineral binder composition to improve the workability. This particularly with hydraulically setting binders, preferably cementitious binders, in particular Portland cement.

The use of a polymer mixture as a grinding assistant for inorganic solids, in particular mineral binders or fillers. Cement, lime, slag and/or plaster are concerned here for example.

Further advantageous embodiments of the invention will become apparent from the working examples which follow.

WORKING EXAMPLES

1. Methods of Measurement

The conversion/progress of the esterification and/or amidation reaction was measured using UPLC (Ultra Performance Liquid Chromatography). First, a calibration curve is established for the polymer and also for the side chains.

Specifically the following apparatus was used:

Instrument: Acquity UPLC with UV and light scattering detector (from Waters, USA)

Column: Acquity UPLC BEH300 C18 1.7 μm 2.1×100 mm (from Waters)

2. Preparation Examples 2.1 Polymer Mixture M-1

A 1500 ml reaction vessel fitted with a mechanical stirrer system, temperature monitoring system, heating mangle and vacuum pump was initially charged with 490 g of an aqueous polyacrylic acid and also 615 g of an aqueous polymethacrylic acid, each having an average molecular weight of about 5000 g/mol. To this were added 12 g of 50% sulphuric acid and 1250 g of methyl polyethylene glycol (MPEG 500, $M_w$=500 g/mol; ≈11.3 ethylene oxide units per molecule) and 10 g of Jeffamin® M2070 (α-methoxy-ω-amino-oxyethylene-oxypropylene copolymer; Mw=2000 g/mol; from Huntsman). The reaction mixture was heated to 175° C., while the water was distilled off. After stirring at 175° C. for 30 minutes, the reaction was carried out at a reduced pressure of 80 mbar until the desired conversion had been reached, which took about 2 hours. UPLC was then used to measure the MPEG and polymer contents. A polymer content of about 95% and a remaining MPEG content of about 5% were determined in this way. The melt was then cooled down and diluted with water to a solids content of 40-50%.

2.2 Reference Polymer RP-1

A 1500 ml reaction vessel fitted with a mechanical stirrer system, temperature monitoring system, heating mangle and vacuum pump was initially charged with 615 g of an aqueous polymethacrylic acid having an average molecular weight of about 5000 g/mol. To this were added sulphuric acid and 625 g of methyl polyethylene glycol (MPEG 500, $M_w$=500 g/mol; ≈11.3 ethylene oxide units per molecule) and 5 g of Jeffamin® M2070. Thereafter the procedure for polymer mixture M-1 was repeated. After about 4.5 hours, the polymer content and the remaining MPEG content were measured as about 95% and as about 5% respectively. The melt was then cooled down and diluted with water to a solids content of 40-50%.

2.3 Reference Polymer RP-2

A 1500 ml reaction vessel fitted with a mechanical stirrer system, temperature monitoring system, heating mangle and vacuum pump was initially charged with 490 g of an aqueous polyacrylic acid having an average molecular weight of about 5000 g/mol. To this were added sulphuric acid and 625 g of methyl polyethylene glycol (MPEG 500, $M_w$=500 g/mol; ≈11.3 ethylene oxide units per molecule) and 5 g of Jeffamin® M2070. Thereafter the procedure for polymer mixture M-1 was repeated. After about 3 hours, the polymer content and the remaining MPEG content were measured as about 95% and as about 5% respectively. The melt was then cooled down and diluted with water to a solids content of 40-50%.

2.4 Reference Mixture RM-1

A reference mixture was prepared by mixing 50 wt % of reference polymer RP-1 with 50 wt % of reference polymer RP-2.

3. Mortar Tests 3.1 Mortar Mixtures

The mortar mixtures used have the dry compositions described in Table 1.

TABLE 1

| Component | Proportion |
|---|---|
| cement (CEM I 42.5 N; Holcim AG, Switzerland) | 750 g |
| limestone filler | 141 g |
| sand 0-1 mm | 738 g |
| sand 1-4 mm | 1107 g |
| sand 4-8 mm | 1154 g |

To mix the mortars, the sands, the filler and the cement were dry-mixed in a Hobart mixer for 1 minute. The mixing water (weight ratio of water to cement (w/c)=0.40) with or without prior admixing with a polymer mixture and/or a polymer (0.2 wt % based on cement content and content of comb polymers) was added within 30 seconds and mixed in for a further 2.5 minutes. Total mixing time wet was 3 minutes in each case.

3.2 Test Procedure

To determine the dispersing effect of the polymer mixtures according to the invention and of the reference samples, the flow value (ABM) of fresh mortars was measured in each case at various times. The flow value (ABM) was determined to the EN 1015-3 standard.

3.3 Results

Table 2 gives an overview of conducted mortar tests (T1-T4) and respective results obtained. Test R is a blank test carried out for comparative purposes, without adding a polymer.

TABLE 2

| | | Mortar test results | | | | | | | |
|---|---|---|---|---|---|---|---|---|---|
| Ad- | | ABM# [mm] after stated number of minutes | | | | | | | t+ |
| No. | ditive | 0 | 30 | 60 | 90 | 120 | 150 | 210 | [h] |
| R | — | <120 | n.m. | n.m. | n.m. | n.m | n.m | n.m. | — |
| T1 | M-1 | 206 | 215 | 205 | 194 | 187 | 170 | 152 | 2.0 |
| T2 | RP-1 | 190 | 181 | 170 | 160 | 158 | 151 | — | 4.5 |
| T3 | RP-2 | 217 | 215 | 210 | 176 | 149 | — | — | 3.0 |
| T4 | RM-1 | 205 | 204 | 200 | 175 | 163 | 155 | — | 7.5* | n.m. = not measurable, since too stiff
\# = flow value as per EN 1015-3. The time "0 min" corresponds to the first measurement on the as-mixed sample of mortar.
+ = preparation time for additive (see section 2)
* = sum total of time needed to prepare RP-1 and RP-2

A comparison of the tests shows that polymer mixture M-1, prepared according to the invention with two different base polymers and applied in test T1, effectuates a distinctly longer-lasting superplasticizing performance than polymers based on a single base polymer (tests T2 and T3). Specifically, fresh mortars comprising the M-1 polymer mixtures of the invention are workable up to 210 minutes after mixing (flow value >150 mm). The RP-1 and RP-2 additives, which are not in accordance with the present invention, only permit this up to at most 150 minutes after mixing (tests T2 and T3). Thereafter, the mortars are no longer workable in practice.

It is also notable that reference mixture RM-1, prepared by subsequent admixing of the RP-1 and RP-2 additives, which are not in accordance with the present invention, are shown by test T4 to fall short of the M-1 polymer mixture of the present invention as regards maintenance of the superplasticizing effect (test T1). Moreover, the process of the present invention is also clearly superior as regards preparation time.

It must be noted in summary that the polymer mixtures obtainable by the process of the present invention represent surprisingly effective dispersants which, in particular, exhibit a high superplasticizing effect and, what is more, sustain it over a comparatively long period.

The invention claimed is:

1. A process for preparing a polymer mixture containing at least two different comb polymers, wherein the comb polymers each have a polymer backbone having side chains attached via ester and/or amide groups, which process comprises the steps of:
   a) providing and/or preparing a reaction mixture containing a first base polymer bearing acid groups and a second base polymer bearing acid groups, wherein the first and second base polymers differ chemically;
   b) conjointly esterifying and/or amidating the first and second base polymers with a unilaterally hydroxyl-terminated side chain compound and/or with a unilaterally amino-terminated side chain compound to obtain at least two different comb polymers.

2. The process according to claim 1, wherein the first and second base polymers are each selected from polyacrylic acid, polymethacrylic acid and/or copolymers formed from acrylic acid and methacrylic acid.

3. The process according to claim 2, wherein the first base polymer is in the form of polyacrylic acid while the second base polymer is in the form of polymethacrylic acid.

4. The process according to claim 1, wherein a number-averaged molecular weight ($M_n$) of the first base polymer and of the second base polymer is in each case in the range of 500-20,000 g/mol.

5. The process according to claim 1, wherein a molar ratio of the first base polymer to the second base polymer in step a) is in the range of 90:10-10:90.

6. The process according to claim 1, wherein the unilaterally hydroxyl-terminated side chain compound comprises an α-alkoxy-ω-hydroxy-polyoxyalkylene and/or in that the unilaterally amino-terminated side chain compound comprises an α-alkoxy-ω-amino-polyoxyalkylene.

7. The process according to claim 1, wherein the unilaterally hydroxyl-terminated side chain compound is a compound of formula (I)

and/or in that the unilaterally amino-terminated side chain compound is a compound of formula (II)

where $R^1$ and $R^2$ are each independently a $C_1$- to $C_{20}$-alkyl group, -cycloalkyl group, -alkylaryl group or a group of the formula -$[AO]_n$—$R^a$,
where A=$C_2$- to $C_4$-alkylene, $R^a$ is a $C_1$- to $C_{20}$-alkyl group,
-cycloalkyl group or alkylaryl group,
and n=2-300.

8. The process according to claim 1, wherein the unilaterally hydroxyl-terminated side chain compound comprises a compound of the formula HO-$[AO]_n$—$R^a$ and/or the unilaterally amino-terminated side chain compound comprises a compound of the formula $H_2N$-$[AO]_n$—$R^a$, where A=$C_2$- to $C_4$-alkylene, $R^a$ is a $C_1$- to $C_{20}$-alkyl group, -cycloalkyl group or -alkylaryl group, and n=2-300.

9. The process according to claim 1, wherein the esterifying and/or amidating step is continued until a ratio of free acid groups of the base polymers to the number of attached side chains in the comb polymers is in the range of 0.5-12.

10. The process according to claim 1, wherein a base and/or an acid are/is added before and/or during steps a) and/or b), as a catalyst, and in that the esterifying and/or amidating in step b) is carried out at a temperature of at least 80° C.

11. A polymer mixture obtainable by a process according to claim 1.

12. A binder composition containing a mineral binder as well as a polymer mixture according to claim 11.

13. A shaped article obtainable by curing a binder composition according to claim 12 after addition of water.

14. A method comprising applying a polymer mixture according to claim 11 as dispersant for mineral binder compositions.

15. A method comprising applying a polymer mixture according to claim 11 to extend the slump life of a mineral binder composition.

* * * * *